(12) United States Patent
Yamada

(10) Patent No.: US 9,002,104 B2
(45) Date of Patent: Apr. 7, 2015

(54) IMAGE PROCESSING APPARATUS

(71) Applicant: Ryuji Yamada, Ogaki (JP)

(72) Inventor: Ryuji Yamada, Ogaki (JP)

(73) Assignee: Brother Kogyo Kabushiki Kiasha, Nagoya-Shi, Aichi-Ken (JP)

(*) Notice: Subject to any disclaimer, the term of this patent is extended or adjusted under 35 U.S.C. 154(b) by 50 days.

(21) Appl. No.: 13/763,969

(22) Filed: Feb. 11, 2013

(65) Prior Publication Data

US 2013/0223728 A1    Aug. 29, 2013

(30) Foreign Application Priority Data

Feb. 29, 2012   (JP) ................................ 2012-044877

(51) Int. Cl.
     G06K 9/00      (2006.01)
     G06K 9/36      (2006.01)
     G06K 9/46      (2006.01)
     H04N 1/64      (2006.01)

(52) U.S. Cl.
     CPC ................ G06K 9/4652 (2013.01); H04N 1/64 (2013.01)

(58) Field of Classification Search
     None
     See application file for complete search history.

(56) References Cited

U.S. PATENT DOCUMENTS

| | | | | |
|---|---|---|---|---|
| 6,067,380 | A * | 5/2000 | Tanaka et al. | 382/232 |
| 7,903,887 | B2 * | 3/2011 | Sasaki et al. | 382/232 |
| 8,280,160 | B2 * | 10/2012 | Matsuoka | 382/166 |
| 8,306,321 | B2 * | 11/2012 | Yamamoto | 382/166 |
| 2010/0074543 | A1 | 3/2010 | Torai | |
| 2010/0098333 | A1 * | 4/2010 | Aoyagi | 382/166 |
| 2012/0014597 | A1 * | 1/2012 | Matsunaga | 382/166 |
| 2012/0262738 | A1 * | 10/2012 | Tamura | 358/1.9 |

FOREIGN PATENT DOCUMENTS

| | | |
|---|---|---|
| JP | 2004-94440 A | 3/2004 |
| JP | 2005-80047 A | 3/2005 |
| JP | 2010-74676 A | 4/2010 |

* cited by examiner

*Primary Examiner* — Anand Bhatnagar

*Assistant Examiner* — Soo Park

(74) *Attorney, Agent, or Firm* — Scully, Scott, Murphy & Presser, P.C.

(57) ABSTRACT

An image processing apparatus includes a reduction unit and a compression unit. The reduction unit is configured to execute color-number reduction processing for each block configured by a plurality of pixels included in a processing target image expressed by processing target image data, the color-number reduction processing including reducing the number of colors expressed by the plurality of pixels in the block to generate image data having the reduced number of colors from the processing target image data, a gradation-number of each color value included in the image data having the reduced number of colors being the same as a gradation-number of each color value included in the processing target image data. The compression unit is configured to execute compression processing using the image data having the reduced number of colors to generate compressed image data.

19 Claims, 11 Drawing Sheets

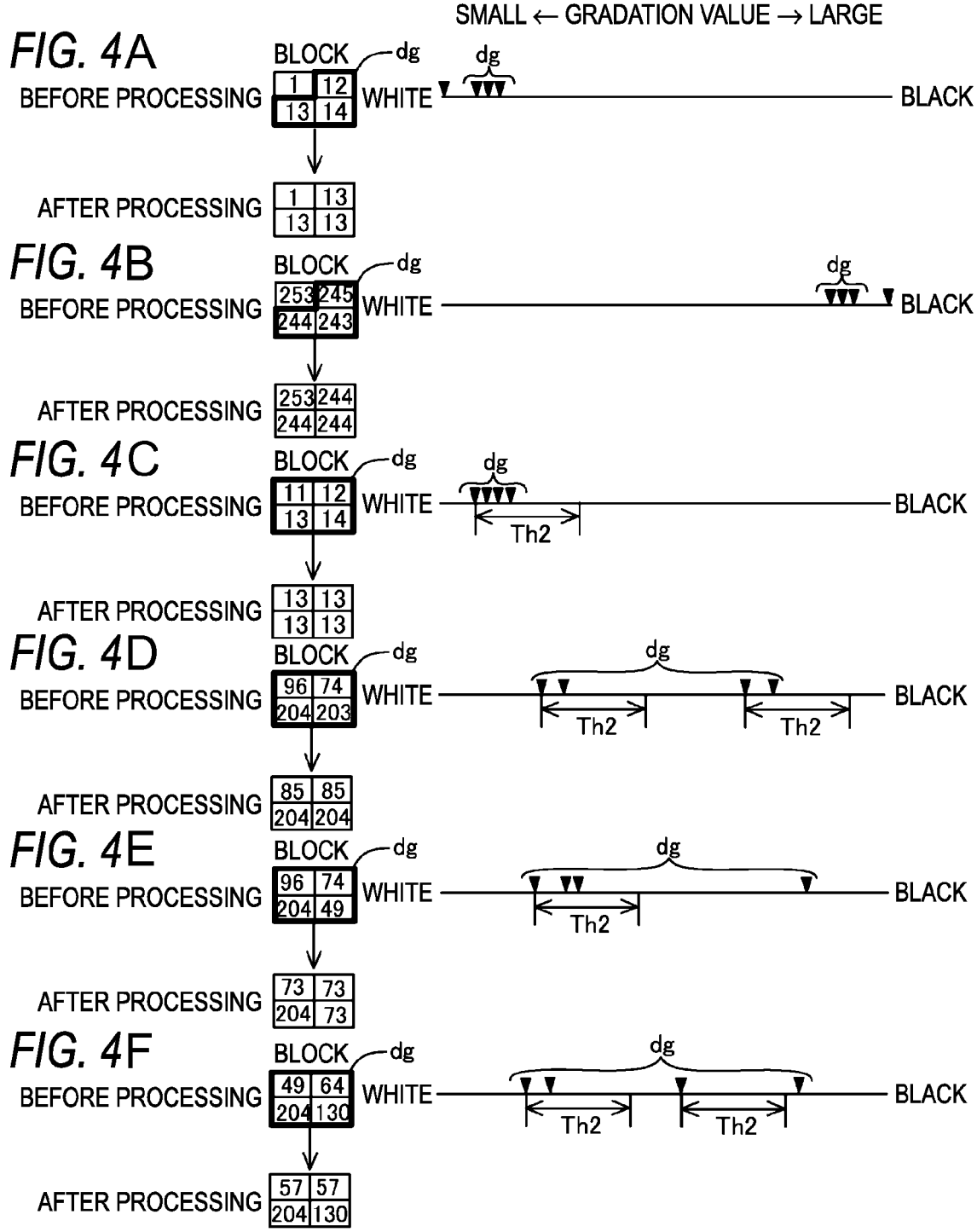

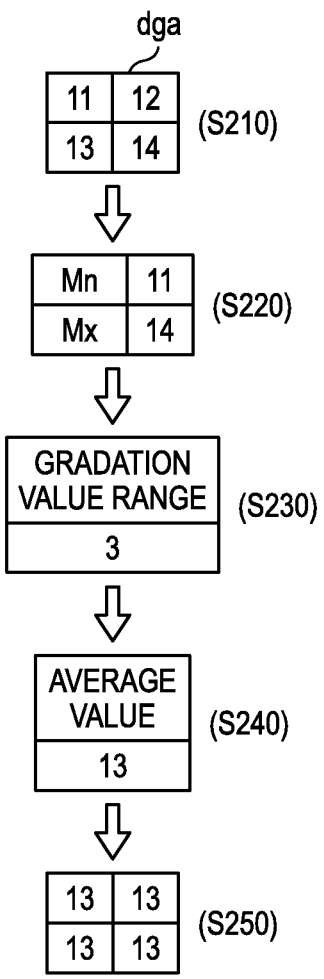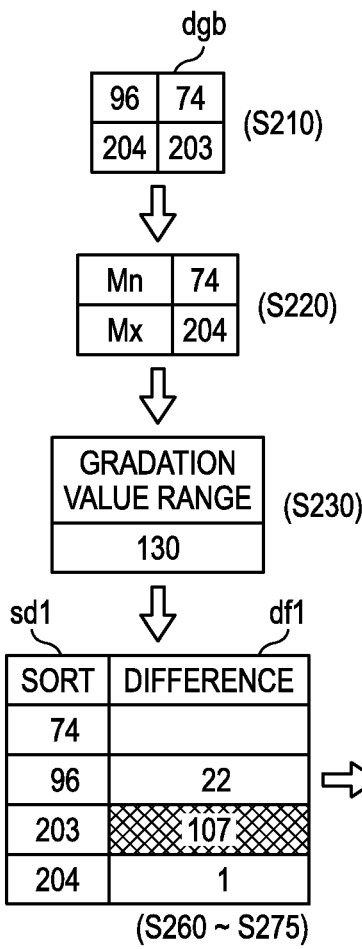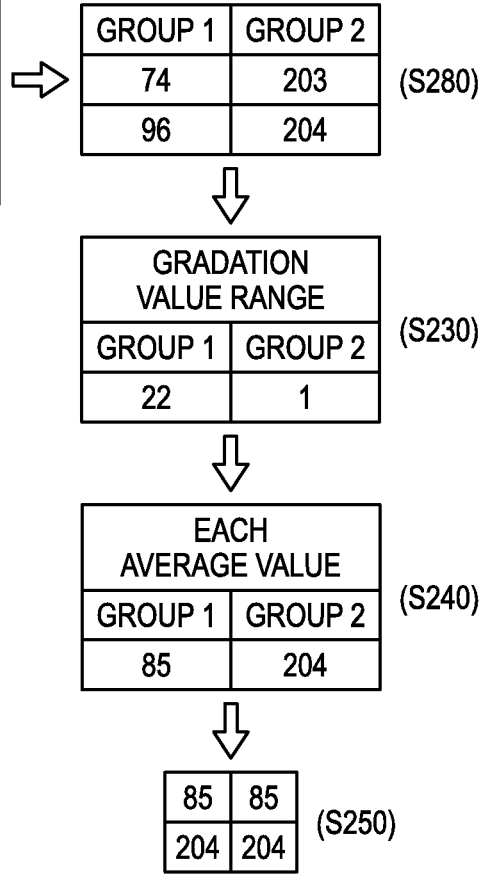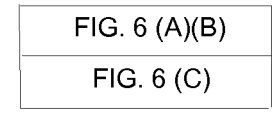
FIG. 6A  FIG. 6B  FIG. 6

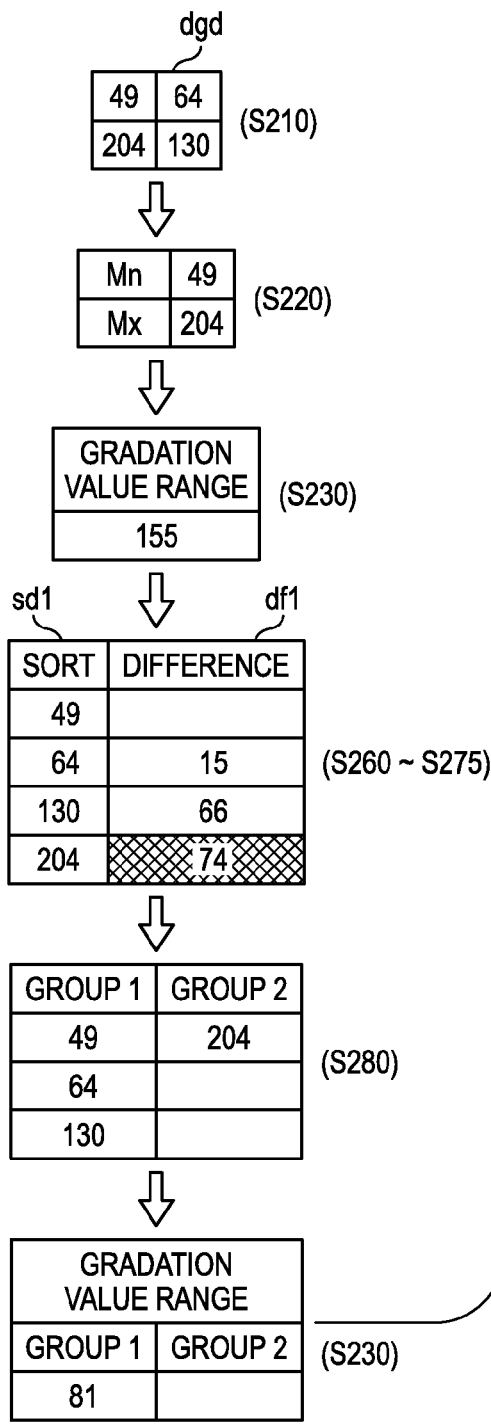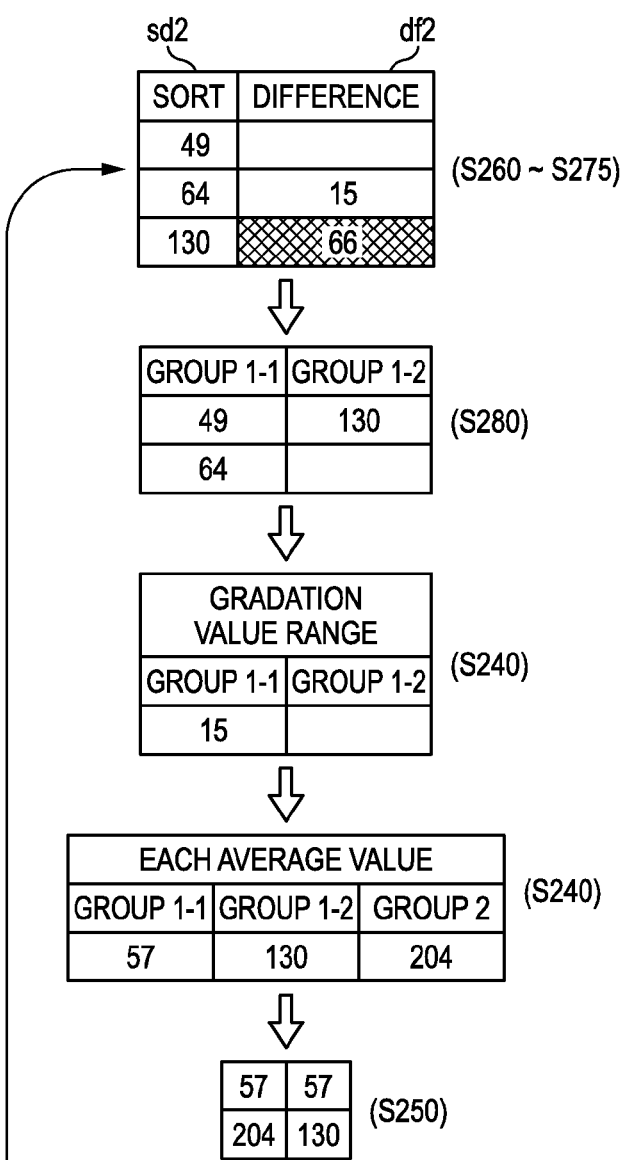
FIG. 7A
FIG. 7
| FIG. 7(A) |
| FIG. 7(B) |

IMAGE PROCESSING APPARATUS

CROSS-REFERENCE TO RELATED APPLICATIONS

This application claims priority from Japanese Patent Application No. 2012-044877 filed on Feb. 29, 2012, the entire subject matter of which is incorporated herein by reference.

TECHNICAL FIELD

The invention relates to a technology of reducing a data size of image data.

BACKGROUND

There have been known an image processing apparatus which reduces a data size of image data and generates processed image data. For example, a related-art image processing apparatus reduces the number of pixels of image data and generates processed image data. As a result, it is possible to reduce resources (memory capacity, processing capacity and the like) necessary for an apparatus (for example, printing apparatus) handling the processed image data.

SUMMARY

In the above-described related-art image processing apparatus, however, when reducing the number of pixels of the image data and reproducing an image that is expressed by the image data with a printing and the like, the reproducibility of the image may be deteriorated.

Therefore, illustrative aspects of the invention provide a technology of reducing a data size of image data while suppressing reproducibility of an image from being deteriorated.

According to one illustrative aspect of the invention, there is provided an image processing apparatus comprising: a processor configured to operate as a reduction unit and a compression unit. The reduction unit is configured to execute color-number reduction processing for each block configured by a plurality of pixels included in a processing target image expressed by processing target image data, the color-number reduction processing comprising reducing the number of colors expressed by the plurality of pixels in the block to generate image data having the reduced number of colors from the processing target image data, a gradation-number of each color value included in the image data having the reduced number of colors being the same as a gradation-number of each color value included in the processing target image data. The compression unit is configured to execute compression processing using the image data having the reduced number of colors to generate compressed image data.

According to the above configuration, the color-number reduction processing of reducing the number of colors is executed for each block in the processing target image, so that the image data having the reduced number of colors is generated from the processing target image data, and the compressed image data is generated using the image data having the reduced number of colors. At this time, the gradation-number of each color value included in the image data having the reduced number of colors is the same as the gradation-number of each color value included in the processing target image data. As a result, it is possible to reduce a data size of the processing target image data while suppressing the reproducibility of the processing target image from being lowered.

The invention can be implemented in a variety of aspects. In addition to the image processing apparatus, the invention can be implemented in an apparatus form such as image data generation apparatus and image processing system. Further, the invention can be implemented in a variety of method forms such as image processing method. Further, the invention can be implemented in a form such as a computer program for implementing the image processing method and a recording medium having the computer program recorded therein.

BRIEF DESCRIPTION OF THE DRAWINGS

FIGS. 4A-4F (hereinafter, "FIG. 4") illustrates a setting of a data group in the color-number reduction processing.

FIGS. 6A-6C (hereinafter, "FIG. 6") is a view for illustrating examples of the averaging processing.

FIGS. 7A-7B (hereinafter, "FIG. 7") is another view for illustrating examples of the averaging processing.

DETAILED DESCRIPTION

Exemplary embodiments of the invention will now be described with reference to the drawings.

(A) First Exemplary Embodiment

(A-1) Configurations of Computing Apparatus and Printing Apparatus

Figure 1:
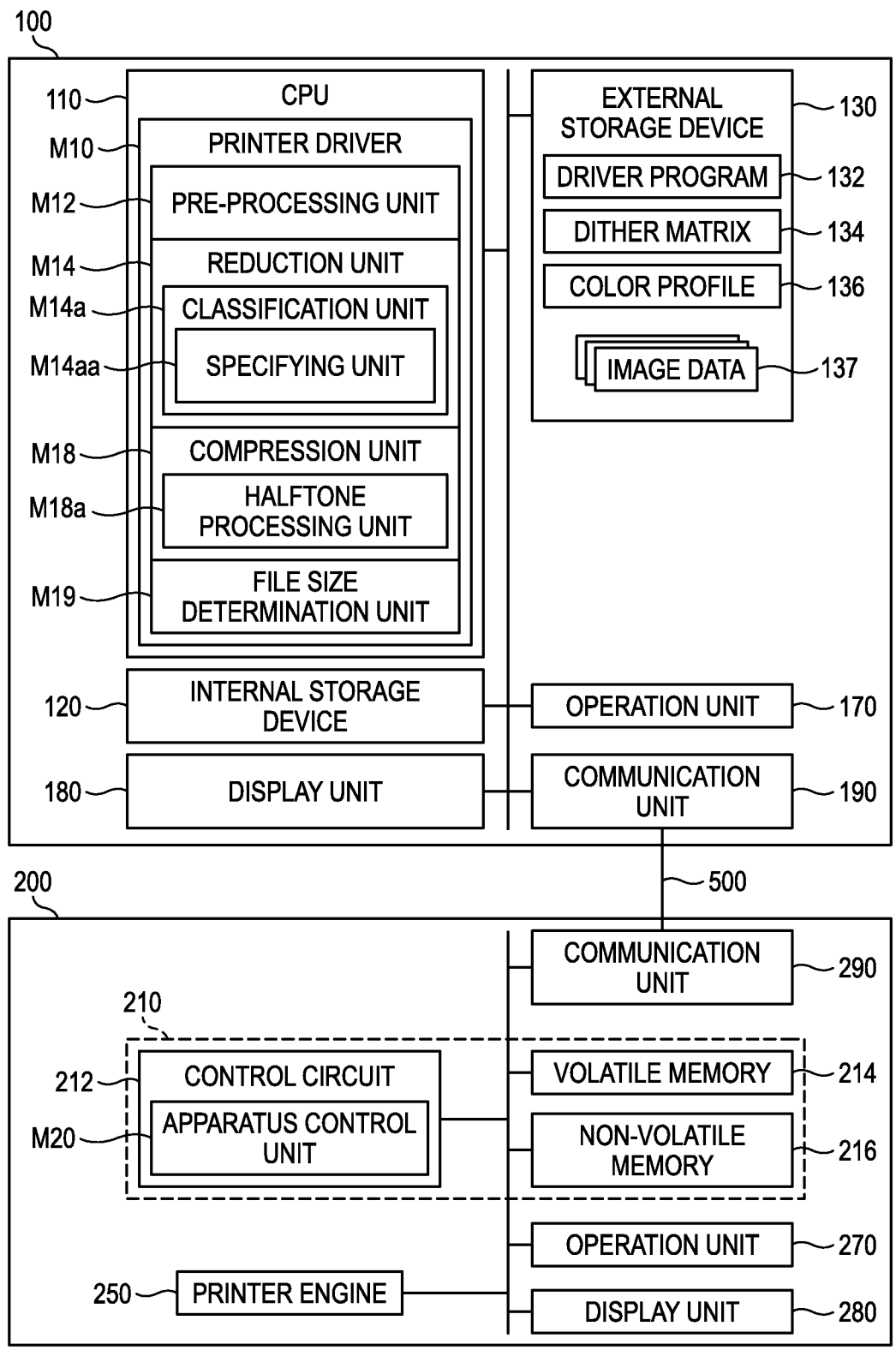
FIG. 1 is a block diagram showing configurations of a computing apparatus and a printing apparatus according to a first exemplary embodiment of the invention.

FIG. 1 is a block diagram showing configurations of a computing apparatus and a printing apparatus of a first exemplary embodiment. The computing apparatus 100 and the printing apparatus (which is also referred to as a printer) 200 are connected in communication with each other via a LAN (Local Area Network) 500.

The computing apparatus 100 includes a CPU 110, an internal storage device 120 such as RAM, ROM and the like, an external storage device 130 such as hard disk drive and the like, an operation unit 170 such as mouse, keyboard and the like, a display unit 180 such as liquid crystal monitor and the like and a communication unit 190 including an interface for performing communication with an external apparatus (for example, the printer 200). The internal storage device 130 is configured to temporarily preserve image data that is used in print data generation processing (which will be described later) or functions as an execution field of a driver program 132 (which will be described later).

The external storage device 130 is configured to store a variety of data, a driver program 132, a plurality of types of dither matrixes 134, a plurality of types of color profiles 136 and image data 137 that is prepared by an application program (not shown), for example. The driver program 132 may be provided with being recorded in a computer-readable recording medium.

The CPU 110 is configured to execute the driver program 132 and function as a printer driver M10. The printer driver M10 includes a pre-processing unit M12, a reduction unit M14, a compression unit M18 and a file size determination unit M19. The reduction unit M14 includes a classification unit M14a. The classification unit M14a includes a specifying unit M14aa. The compression unit M18 includes a halftone processing unit M18a. These functional blocks are configured to execute the print data generation processing that will be described later. The printer driver M10 is configured to transmit print data, which is generated by the print data generation processing, to the printer 200 via the communication unit 190.

The printer 200 includes an integrated circuit 210, a printer engine 250, an operation unit 270 such as an operation panel, buttons, and the like, a display unit 280 such as liquid crystal panel and the like and a communication unit 290 including an interface for performing communication with an external apparatus (for example, the computing apparatus 100).

The integrated circuit 210 is an ASIC (Application Specific Integrated Circuit), for example. The integrated circuit 210 includes a control circuit 212, a volatile memory 214 such as DRAM and the like and a non-volatile memory 216 such as mask read-only memory, EEPROM and the like. The volatile memory 214 provides a buffer area that is used by the control circuit 212. The non-volatile memory 216 stores therein a control program and the like. The control circuit 212 is configured to execute the control program (not shown) preserved in the non-volatile memory 216 so as to function as an apparatus control unit M20. The apparatus control unit M20 is configured to overall control the printer 200 and temporarily preserves the print data, which is transmitted from the computing apparatus 100 via the communication unit 290, in a buffer area of the volatile memory 214 and to transmit the same to the printer engine 250.

The printer engine 250 is configured to control the apparatus control unit M20 and to perform a printing operation in response to the print data supplied from the apparatus control unit M20. The printer engine 250 is configured to implement a function of a monochrome laser printer configured to print a dot image on a printing medium by using black toners that serves as a color material. That is, the printer engine 250 is configured to implement: an exposure process of exposing a photosensitive member by using laser; a developing process of attaching toners to an electrostatic latent image that is formed on the photosensitive member by the exposure process; a transfer process of transferring a developed toner image from the photosensitive member to a printing medium; and a fixing process of fixing the transferred toner image on the printing medium.

(A-2) Print Data Generation Processing

Figure 2:
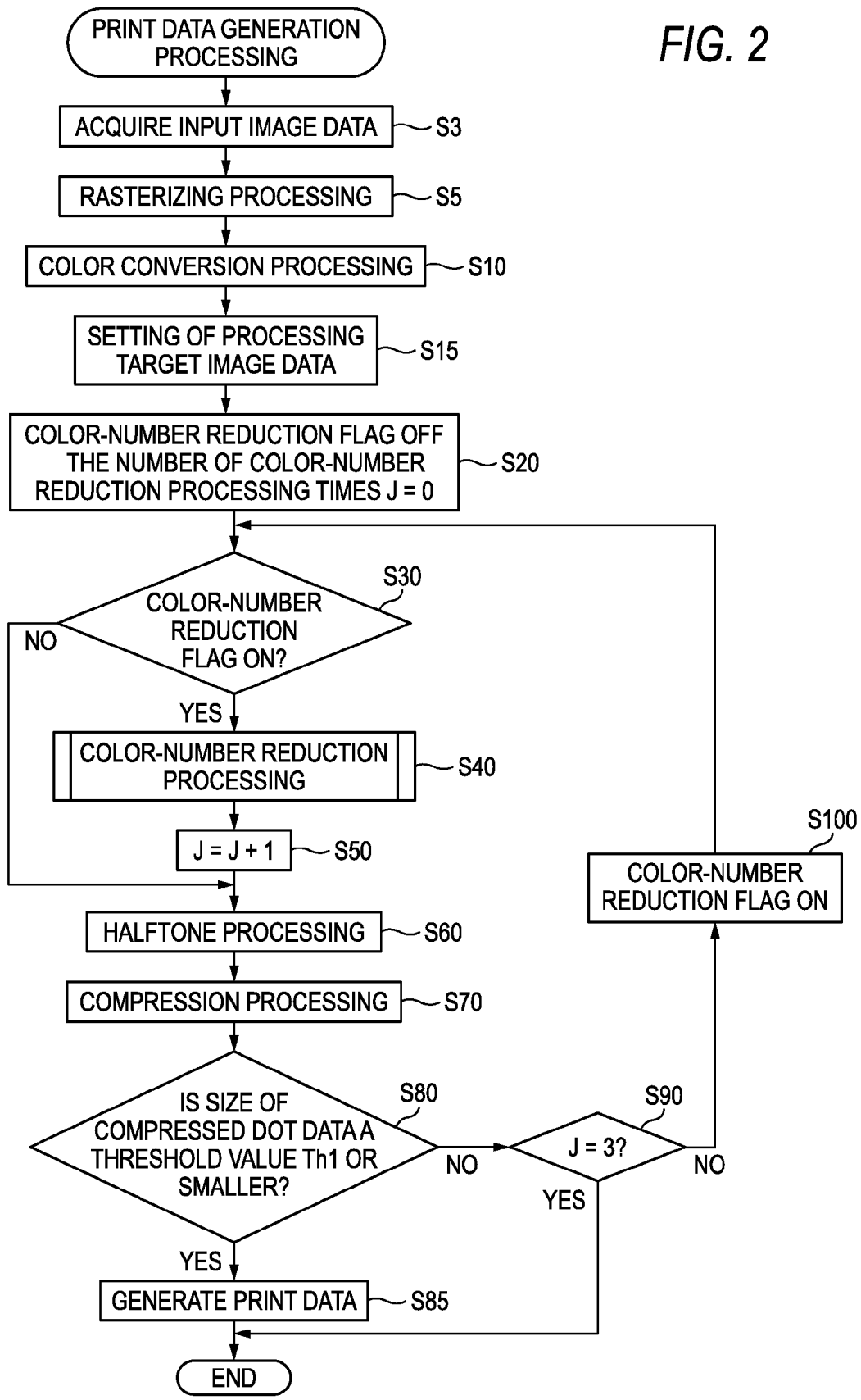
FIG. 2 is a flowchart showing print data generation processing.

FIG. 2 is a flowchart showing the print data generation processing. When a printing instruction is received from a user via the operation unit 170, the printer driver M10 initiates the print data generation processing of generating print data by using image data (which is also referred to as 'input image data') of a print target. The print data generation processing is to perform a variety of processing such as rasterizing processing, color conversion processing, the number of colors (color-number) reduction processing, halftone processing and compression processing, so as to generate print data. In this exemplary embodiment, the print data is used for a printing having a print resolution such as 300 long×300 wide (dpi). In the below, the print data generation processing will be described.

In step S3, the pre-processing unit M12 acquires input image data. The input image data is the above-described image data 137 (FIG. 1), for example, and is acquired from the application program having prepared the image data 137. The image data 137 has a data format that is different for each application program having prepared the image data.

In step S5, the pre-processing unit M12 converts the input image data into bitmap data (RGB pixel data) expressing colors of pixels with gradation values (for example, 256 gradations) of three elements of red, green and blue (rasterizing processing).

In step S10, the pre-processing unit M12 converts the RGB image data into bitmap data (which is also referred to as K image data or monochrome image data) consisting of monochromatic image data (which is also referred to as K pixel data) indicating a density of a black (K) component (color conversion processing). In this exemplary embodiment, the K pixel data is a gradation value within a range of 0 to 255. The larger gradation value indicates an achromatic color having a higher density (closer to black). Specifically, the pre-processing unit M12 calculates a brightness value Y of the RGB pixel data, for example. The pre-processing unit M12 converts the brightness value Y into the K pixel data by using the color profiles 136 (for example, a look-up table).

In step S15, the pre-processing unit M12 sets the K image data as processing target image data.

In step S20, the reduction unit M14 sets a color-number reduction flag to be OFF and sets the number of color-number reduction processing times J to be zero (0). Incidentally, the color-number reduction flag and the number of color-number reduction processing times J are stored in the internal storage device 120.

In step S30, the reduction unit M14 determines whether the color-number reduction flag is ON. When the color-number reduction flag is ON (step S30: Yes), the reduction unit M14 executes color-number reduction processing (step S40). Further, in step S50, the reduction unit M14 adds '1' to the number of color-number reduction processing times J after the color-number reduction processing. The color-number reduction processing will be described later. On the other hand, when the color-number reduction flag is OFF (step S30: No), the reduction unit M14 proceeds to step S60 that will be described later. When the reduction unit M14 performs the determination of step S30 for the first time upon the start-up of the print data generation processing, since the color-number reduction flag is set OFF (step S20), the reduction unit M14 executes processing of step S60 without executing the processing of steps S40 and S50.

In step S60, the halftone processing unit M18a of the compression unit M18 executes the halftone processing for the processing target image data set in step S15 when the color-number reduction processing has not been performed in the just previous processing (step S30: No). On the other hand, in step S60, when the color-number reduction processing has been performed (step S30: Yes), the halftone processing unit M18a executes the halftone processing for image data (image data having the reduced number of colors that will be described later) after the color-number reduction processing. Specifically, as the halftone processing, the halftone processing unit M18a compares the K pixel data and the dither matrixes 134 to thus generate dot data, which indicates a formation state of a dot for each pixel, from the bitmap data (processing target image data or image data having the reduced number of colors). In this exemplary embodiment, each pixel data configuring the dot data is binary data having any one of a value '1' indicating that a corresponding pixel forms a dot and a value '0' indicating that a corresponding pixel does not form a dot. Incidentally, in this exemplary embodiment, the halftone processing unit M18a executes the halftone processing such that the gradation-number of each pixel data configuring the dot data becomes binary. However, the invention is not limited thereto. For example, the halftone processing unit M18a executes the halftone processing such that the gradation-number of each pixel data configuring the dot data becomes ternary or larger.

In step S70, the compression unit M18 executes compression processing for the dot data and generates compressed dot data. The compression unit M18a executes pattern compression processing, for example, as the compression processing. In the below, the pattern compression processing will be described.

The compression unit M18 first divides the dot data into groups of four pixel data from the head thereof, as the pattern compression processing. The compression unit M18 determines whether a data pattern of the pixel data of each group corresponds to any one of predetermined data patterns. The compression unit M18 determines whether a data pattern of a leading group matches a data pattern of a second group. When they match, the compression unit M18 sets the second group or later as a search target and continues the search until a data pattern does not match the data pattern of the leading group in accordance with an order of the groups. When U groups of the data pattern matching the data pattern of the leading group are continuously found, the compression unit M18 describes (A1, B1, C1, D1) [U] by using a value (A1, B1, C1, D1), which indicates the data pattern of the leading group, and an identification value [U], which indicates that the number of groups continuously matched is U. In this exemplary embodiment, [U] is indicated with four bits. When the data pattern of the leading group do not match the data pattern of the second group, the compression unit M18 describes (A1, B1, C1, D1) [0000] by using the value (A1, B1, C1, D1), which indicates the data pattern of the leading group, and an identification value [0000], which indicates that the number of groups continuously matched is zero (0).

That is, when U data patterns matching the data pattern (Ax, Bx, Cx, Dx) of the xth group are continuously found, the compression unit M18 describes (Ax, Bx, Cx, Dx) [U]. Further, when the data pattern (Ax, Bx, Cx, Dx) of the xth group does not match the data pattern of the (x+1)th group, the compression unit M18 describes (Ax, Bx, Cx, Dx) [0000].

For example, the data (seven data patterns) of '(A1, B1, C1, D1), (A2, B2, C2, D2), (A2, B2, C2, D2), (A2, B2, C2, D2), (A2, B2, C2, D2), (A2, B2, C2, D2) and (A2, B2, C2, D2)' is described as (A1, B1, C1, D1) [0000] (A2, B2, C2, D2) [0110] when the data is pattern-compressed. In this case, since the data patterns are respectively described with four bits, a data size before the compression becomes 28 bits (=7 (the total number of data patterns)×4 (the number of bits of the data pattern)). On the other hand, a data size after the compression becomes 16 bits (=2 (the total number of data patterns)×4 (the number of bits of the data pattern)+2 (the number of identification values indicating the number of groups continuously matched)×4 (the number of bits of the identification value)). Like this, as the group of the same data pattern continues, the data size after the pattern compression becomes smaller than the data size before the compression.

In step S80, the file size determination unit M19 determines whether a data size of the compressed dot data is a threshold value Th1 or smaller. When a data size of the compressed dot data is a threshold value Th1 or smaller (step S80: Yes), the file size determination unit M19 proceeds to processing of step S85. In step S85, the printer driver M10 generates print data by using the compressed dot data. Specifically, the printer driver M10 describes a variety of information (header information and the like) in the compressed dot data, generates the print data and then ends the print data generation processing.

When a data size of the compressed dot data is larger than the threshold value Th1 (step S80: No), the file size determination unit M19 proceeds to processing of step S90.

In step S90, the reduction unit M14 determines whether the number of color-number reduction processing times J is 3, e.g., whether the color-number reduction processing has been performed three times. When the color-number reduction processing has been performed three times (step S90: Yes), the reduction unit M14 ends the print data generation processing. On the other hand, when the color-number reduction processing has not been performed three times (step S90: No), the reduction unit M14 sets the color-number reduction flag to be ON so as to execute the color-number reduction processing (step S100) and proceeds to processing of step S30. Incidentally, when the data size of the compressed dot data is not the threshold value Th1 or smaller and the print data generation processing is ended (step S80: No and step S90: Yes) even though the color-number reduction processing has been performed three times, the printer driver M10 may execute following processing. That is, the printer driver M10 may execute processing of reducing the gradation-number of each pixel of the input image data and/or processing (for example, resolution reducing processing) of reducing the number of pixel data of the input image data and then again execute the print data generation processing.

(A-3) Color-Number Reduction Processing

Figure 3:
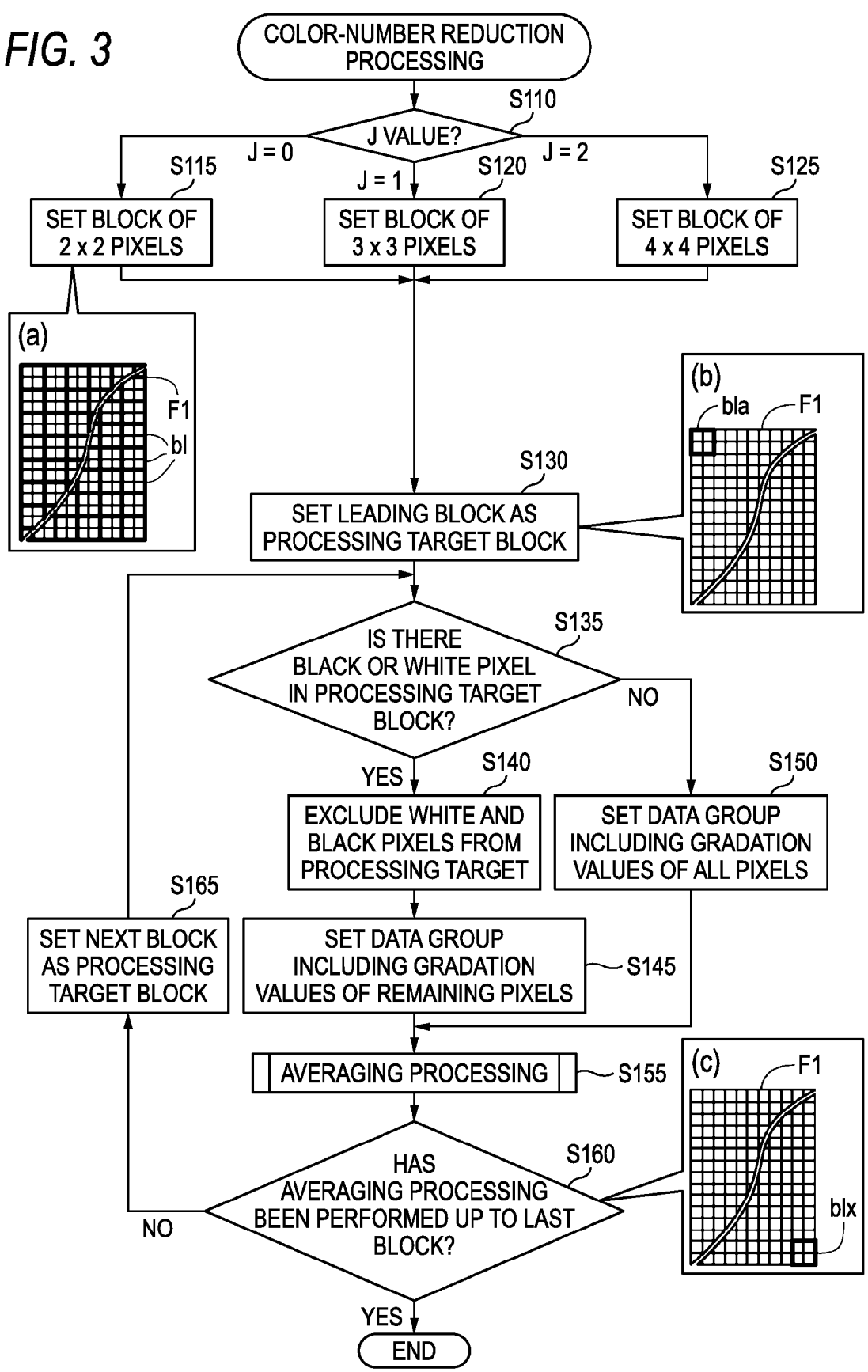
FIG. 3 is a flowchart showing color-number reduction processing.

FIG. 3 is a flowchart showing the color-number reduction processing. In the color-number reduction processing, the reduction unit M14 sets a plurality of blocks in a processing target image that is expressed by the processing target image data and then executes averaging processing for each block. The averaging processing is executed such that the gradation-number (the number of bits) of each gradation value included in the processing target image data before the processing is the same as the gradation-number (the number of bits) of each gradation value included in the image data that is generated after the processing. In the below, the color-number reduction processing and the averaging processing that is included in the color-number reduction processing will be described.

First, in step S110 of the color-number reduction processing, the reduction unit M14 determines whether the number of color-number reduction processing times J is 0, 1 or 2. When the number of color-number reduction processing times J is 0 (which means that the color-number reduction processing is the first time processing) (step S110: J=0), the reduction unit M14 sets a plurality of blocks (which is also referred to as blocks of 2×2 pixels and is indicated with a reference numeral 'b1' in FIG. 3(a)) configured by 2 pixels long×2 pixels wide in the processing target image (which is indicated with a reference numeral 'F1' in FIG. 3(a)) (step S115), as shown in FIG. 3(a). When the number of color-number reduction processing times J is 1 (which means that the color-number reduction processing is the second time processing) (step S110: J=1), the reduction unit M14 sets a plurality of blocks (which is also referred to as blocks of 3×3 pixels) configured by 3 pixels long×3 pixels wide in the processing target image (step S120). When the number of color-number reduction processing times J is 2 (which means that the color-number reduction processing is the third time processing) (step S110: J=2), the reduction unit M14 sets a plurality of blocks (which is also referred to as blocks of 4×4 pixels) configured by 4 pixels long×4 pixels wide in the processing target image (step S125). In this exemplary embodiment, the respective blocks are arranged in a matrix shape, as shown in FIG. 3(a).

In this exemplary embodiment, as described above, the print resolution of 300 long×300 wide (dpi) is assumed. In this case, the block of 4×4 pixels is a size corresponding to one pixel of 75 long×75 wide (dpi). When a block larger than the block of 4×4 pixels is used, the image quality may be deteriorated. Hence, in this exemplary embodiment, the block of 4×4 pixels is set as a block of a maximum size.

Subsequently, in step S130, the reduction unit M14 sets the leading block (which is indicated with a reference numeral 'b1a' in FIG. 3(b)) as a processing target block, as shown in FIG. 3(b). In this exemplary embodiment, the leading block is a block that is positioned at a left-upper part of the processing target image, as shown in FIG. 3(b).

In step S135, the reduction unit M14 determines whether there is a pixel having a gradation value indicating white or black in the processing target block. The gradation value indicating white is a gradation value belonging to a first specific range including the minimum value '0' of the gradation values. In this exemplary embodiment, the first specific range is set to be 0 to 5. Further, the gradation value indicating black is a gradation value belonging to a second specific range including the maximum value '255' of the gradation values. In this exemplary embodiment, the second specific range is set to be 251 to 255. Incidentally, the first specific range may include the minimum value '0' only, or may include P gradation values (P is an integer of 2 or larger) continuing from the minimum value. Further, the second specific range may include the maximum value '255' only, or may include P gradation values continuing from the maximum value.

When there is a pixel having a gradation value indicating white or black in the processing target block (step S135: Yes), the reduction unit M14 excludes the pixels having the gradation values indicating white and black from the averaging processing target (which will be described later) (step S140), sets a data group including the gradation values of the other remaining pixels, and proceeds to processing of step S155. On the other hand, when there is no pixel having a gradation value indicating white or black in the processing target block (step S135: No), the reduction unit M14 sets a data group including the gradation values of all pixels in the processing target block (step S150), and proceeds to processing of step S155.

FIG. 4 illustrates the setting of a data group in the color-number reduction processing. FIG. 4 shows: an arrangement of gradation values of respective pixels in the processing target block before the averaging processing; a distribution of the gradation values for each gradation value pattern; and an arrangement of the gradation values of the respective pixels in the processing target block after the averaging processing. In the distribution view, a left direction indicates a direction along which the gradation value becomes smaller, and a right direction indicates a direction along which the gradation value becomes larger. Incidentally, a reference numeral 'Th2' (standard range) shown in FIG. 2 will be described in the averaging processing of FIG. 5.

In examples of FIG. 4(A) or FIG. 4(B), the gradation value (the gradation value '1' of FIG. 4(A)) indicating white and the gradation value (the gradation value '253' of FIG. 4(B)) indicating black are not included in the data group dg and are excluded from the target of the averaging processing. On the other hand, in examples of FIG. 4(C) to FIG. 4(F), since the gradation values indicating white and black are not included in the processing target blocks, the data groups dg including the gradation values of all pixels are set.

In step S155 of FIG. 3, the reduction processing M14 executes the averaging processing. The averaging processing will be described later.

In step S160, the reduction unit M14 determines whether the averaging processing has been performed up to for a last block (which is indicated with a reference numeral 'b1x' in FIG. 3(c)), e.g., whether the averaging processing has been performed for all blocks. In this exemplary embodiment, as shown in FIG. 3(c), the last block is a block that is positioned at a right-lower part of the processing target image.

When it is determined that the averaging processing has been performed up to for a last block (step S160: Yes), the reduction unit M14 ends the color-number reduction processing. By executing the processing of steps S135 to S160, the image data having the reduced number of colors is generated. Incidentally, a size (the number of pixels) of an image having the reduced number of colors, which is expressed by the image data having the reduced number of colors, is the same as the size (the number of pixels) of the processing target image (processing target image before the image having the reduced number of colors) expressed by the processing target image data set in step S15.

On the other hand, when it is determined that the averaging processing has not been performed up to for a last block (step S160: No), the reduction unit M14 sets a next block as the processing target block (step S165) and proceeds to the processing of step S135. In this exemplary embodiment, a setting sequence of the processing target block is as follows. That is, when there is an adjacent block at the right of the current processing target block, the corresponding block is set as a next processing target block. When there is no adjacent block at the right of the current processing target block, a block that is positioned at one below stage and at the leftmost is set as a next processing target block.

(A-4) Averaging Processing

Figures 5, 5A, 5B:
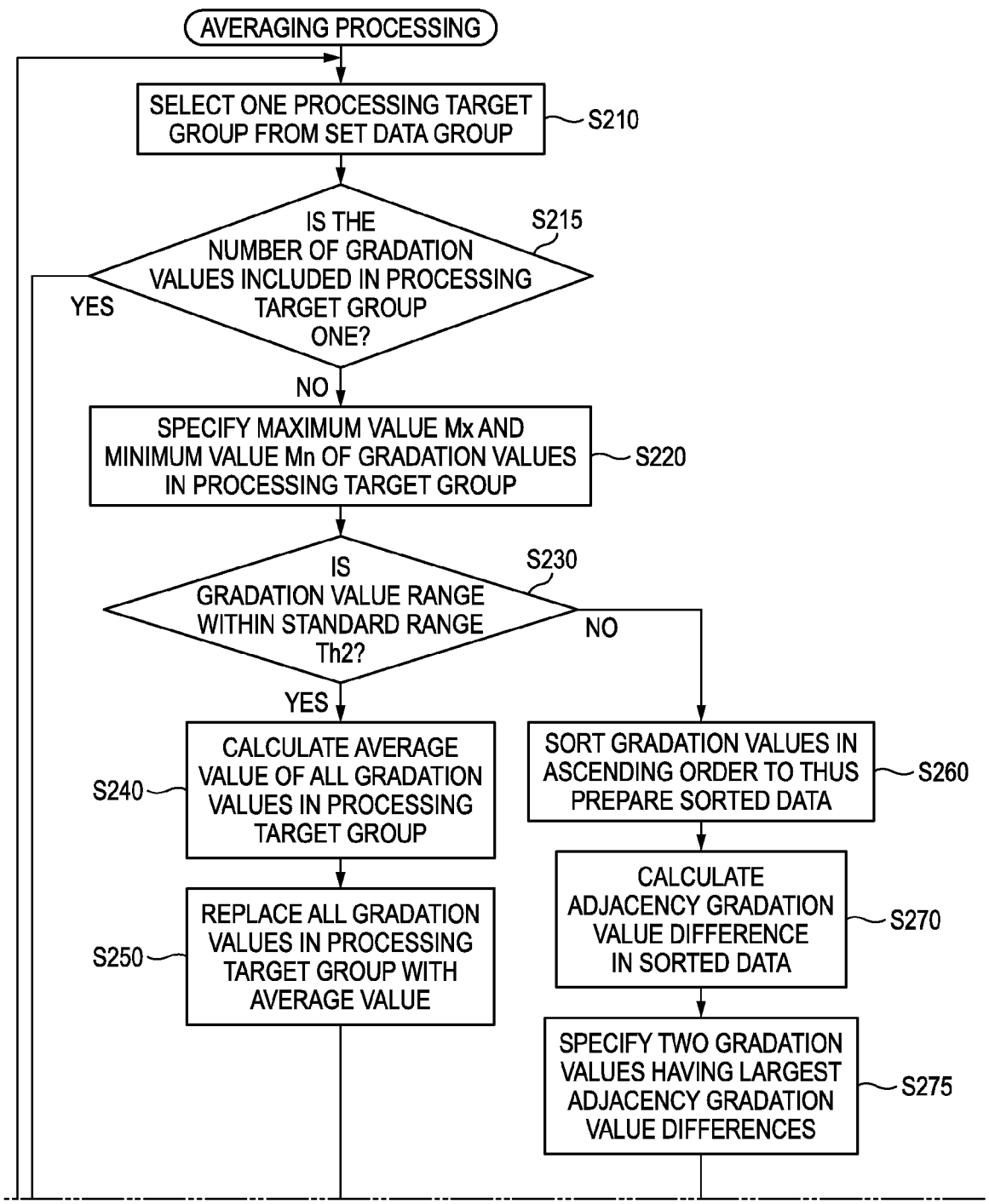
FIGS. 5A-5B (hereinafter, "FIG. 5") is a flowchart of averaging processing.
Figure 5B:
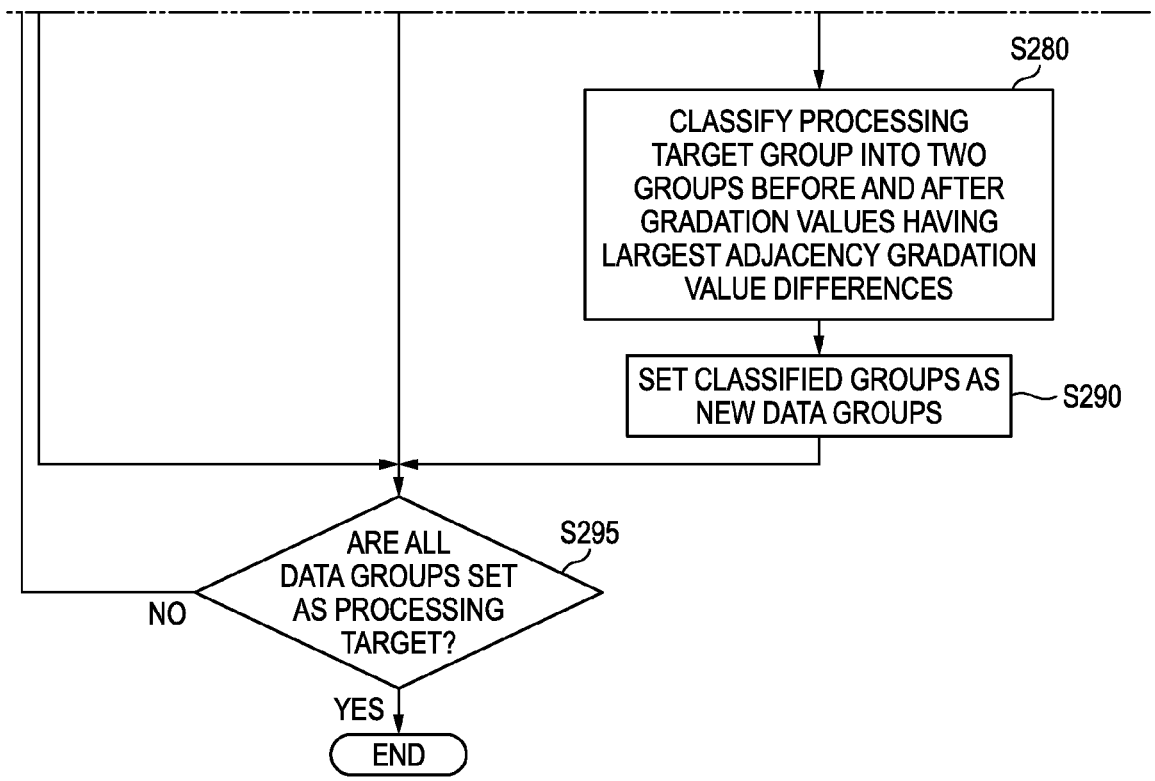

In the below, the averaging processing will be described. FIG. 5 is a flowchart showing the averaging processing. In step S210 of FIG. 5, the reduction unit M14 selects one processing target group from the set data groups dg. In first step S210 of the averaging processing, the data group dg, which is set in step S145 or step S150 of the color-number reduction processing of FIG. 3, is selected as the processing target group.

Subsequently, in step S215, the reduction unit M14 determines whether the types of the gradation values included in the processing target group are one or more. That is, the reduction unit M14 determines whether the gradation values of the respective pixels included in the processing target group are the same or not.

When the types of the gradation values included in the processing target group are one (step S215: Yes), e.g., when the gradation values of the respective pixels included in the processing target group are the same, the reduction unit M14 proceeds to processing of step S295.

When the types of the gradation values included in the processing target group are two or more (step S215: No), e.g., when the gradation values of the respective pixels included in the processing target group are not the same, the reduction unit M14 specifies a maximum value Mx and a minimum value Mn of the gradation values in the processing target group (step S220).

In step S230, the reduction unit M14 calculates a difference between the maximum value Mx and the minimum value Mn (the maximum value Mx−the minimum value Mn) (which is also referred to as a gradation value range) and determines whether the gradation value range is within the standard range Th2. In this exemplary embodiment, a value of the standard range Th2 is fixed to be '64'. Incidentally, when the gradation value range is the same as the standard range Th2, the reduction unit M14 determines that the gradation value range is not within the standard range Th2, e.g., that the gradation value range is beyond the standard range Th2.

When the gradation value range is within the standard range Th2 (step S230: Yes), the reduction unit M14 calculates an average value of all the gradation values included in the processing target group (step S240). Specifically, the reduction unit M14 calculates a sum of all the gradation values (0 to 255) included in the processing target group and divides the calculated sum by the number of gradation values included in the processing target group, thereby calculating an average value. Incidentally, the average value of the gradation values can be calculated by rounding off the first decimal point. In step S250, the reduction unit M14 replaces all the gradation values included in the processing target group with the average value, e.g., sets all the gradation values with the same value (common value), and proceeds to processing of step S295.

On the other hand, when it is determined that the gradation value range is not within the standard range Th2, e.g., it is determined that the gradation value range is beyond the standard range Th2 (step S230: No), the reduction unit M14 maintains the gradation values included in the processing target group without changing the same and the classification unit M14a sorts the gradation values in ascending order, thereby preparing sorted data (step S260). In step S270, the specifying unit M14aa calculates an adjacency gradation value difference, which is a difference between each gradation value and a one previous gradation value, in the sorted data. In step S275, the specifying unit M14aa specifies two gradation values having the largest adjacency gradation value differences. In step S280, the classification unit M14a classifies the processing target group into two groups before and after the two gradation values having the largest adjacency gradation value differences. Specifically, the classification unit M14a classifies one gradation value (which is also referred to as a first gradation value) of the two gradation values specified by the specifying unit M14aa and the gradation value smaller than the first gradation value into one group, and also classifies the other gradation value (which is also referred to as a second gradation value) of the two gradation values, which is larger than the first gradation value, and the gradation value larger than the second gradation value into the other group. In step S290, the reduction unit M14 sets the classified groups as new data groups that can be selected in step S210 and proceeds to processing of step S295. Incidentally, the group before the classification (processing target group) is excluded from the set data groups (data groups becoming the selection target in step S210).

In step S295, the reduction unit M14 determines whether all the set data groups are set as the processing target. When all the set data groups are not set as the processing target (step S295: No), the reduction unit M14 proceeds to the processing of step S210. When all the set data groups are set as the processing target (step S295: Yes), the reduction unit M14 ends the averaging processing. Incidentally, as can be seen from the above descriptions, the data group is one group upon the starting of the averaging processing. However, the data group is increased one by one whenever the classification of the processing target group (data grous) is performed in step S280.

As described above, the color-number reduction processing of the first exemplary embodiment is executed based on following processing conditions.

Processing condition 1: The value of the standard range Th2 is fixed.

Processing condition 2: When the color-number reduction processing is again executed because the data size of the compressed dot data is larger than the threshold value Th1, a block larger than the block that has been used in the previous color-number reduction processing is set.

Incidentally, in this exemplary embodiment, the value of the standard range Th2 is fixed to be 64. The reason is as follows. That is, the value '64' of the standard range Th2 indicates a color difference corresponding to a value '20' of a color-difference (a distance in a CIELab color space). The value '20' of a color-difference corresponds to an allowed color-difference of grade 6 described in the color handbook (2nd edition). Therefore, when the value of the standard range Th2 is set to be larger than 64, the possibility that the image quality will be deteriorated is increased.

(A-5) Example of Averaging Processing

FIGS. 6 and 7 illustrate examples of the averaging processing. Here, examples (Examples 1 to 4) where the averaging processing is performed with a block of 2×2 pixels and an example (Example 5) where the averaging processing is performed with a block of 4×4 pixels will be described. Incidentally, the respective processes shown in FIGS. 6 and 7 are indicated with the step numbers corresponding to the processing steps of the averaging processing.

Example 1

The averaging processing (FIG. 5) for the data group dg shown in FIG. 4C will be described with reference to FIG. 6(A). The reduction unit M14 sets the data group dg as the processing target group (which is indicated with a reference numeral 'dga' in FIG. 6(A)) in step S210. As shown in FIG. 6(A), since the number of the types of the gradation values included in the processing target group dga is four (4) types (step S215: No), the reduction unit M14 specifies a maximum value Mx '14' and a minimum value Mn '11' of the gradation values in the processing target group dga (step S220). The reduction unit M14 calculates a gradation value range '3' from the specified maximum value Mx and minimum value Mn (step S230). Since the gradation value range is within the standard range Th2 (step S230: Yes), the reduction unit M14 calculates an average value '13' of the four gradation values in the processing target group dga (step S240). As shown in FIG. 6(A), the reduction unit M14 replaces the four gradation values in the processing target group dga with the average value (step S250). According thereto, the colors that are expressed by the gradation values in the block are reduced from four colors to one color.

Example 2

The averaging processing (FIG. 5) for the data group dg shown in FIG. 4(D) will be described with reference to FIG. 6(B). The reduction unit M14 sets the data group dg as the processing target group (which is indicated with a reference numeral 'dgb' in FIG. 6(B)) in step S210. As shown in FIG. 6(B), since the number of the types of the gradation values included in the processing target group dgb is four (4) types (step S215: No), the reduction unit M14 specifies a maximum value Mx '204' and a minimum value Mn '74' of the gradation values in the processing target group dgb (step S220). The reduction unit M14 calculates a gradation value range '130' from the specified maximum value Mx and minimum value Mn. Since the gradation value range is beyond the standard range Th2 (step S230: No), the classification unit M14a sorts the gradation values in ascending order, thereby preparing sorted data sd1 (step S260). The specifying unit M14aa prepares difference data df1, which indicates the adjacency gradation value difference, by using the sorted data (step S270) and specifies two gradation values having the largest adjacency gradation value differences (step S275). The classification unit M14a classifies the processing target group dgb into two groups (group 1 and group 2) before and after the two gradation values having the largest adjacency gradation value differences (in FIG. 6(B), the larger gradation value of the two gradation values is cross-hatched) (step S280). The reduction unit M14 sets the two classified groups as new data groups that can be selected in step S210 (step S290).

Subsequently, the reduction unit M14 performs the processing of steps S210 to S220 for the groups 1 and 2, thereby calculating gradation value ranges, respectively (step S230). Since the gradation value range '22' of the group 1 and the gradation value range '1' of the group 2 are within the standard range Th2, respectively (step S230: Yes), the reduction unit M14 calculates an average value '85' of the two gradation values in the group 1 and an average value '204' of the two gradation values in the group 2. As shown in FIG. 6(B), the reduction unit M14 replaces the two gradation values corresponding to the group 1 in the processing target group dgb with the average value of the two gradation values of the group 1, and replaces the two gradation values corresponding to the group 2 with the average value of the two gradation values of the group 2 (step S250). According thereto, the colors that are expressed by the gradation values in the block are reduced from four colors to two colors.

Example 3

Figure 6C:
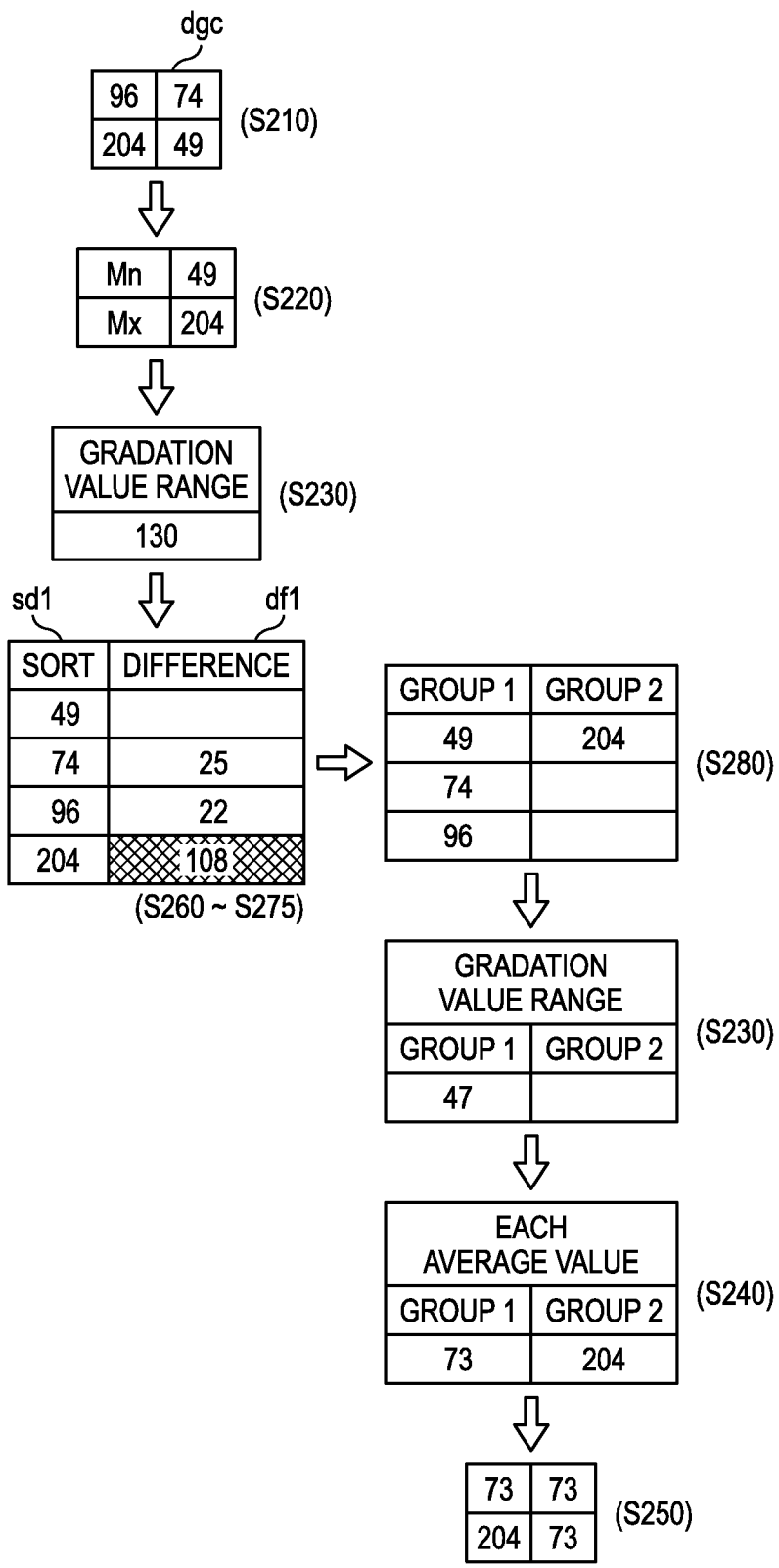

The averaging processing (FIG. 5) for the data group dg shown in FIG. 4(E) will be described with reference to FIG. 6(C). The classification unit M14a classifies the processing target group (which is indicated with a reference numeral 'dgc' in FIG. 6(C)) into two groups (group 1 and group 2) in the same manner as the processing of the above-described Example 2 (step S280). The reduction unit M14 sets the two classified groups as new data groups that can be selected in step S210 (step S290). The reduction unit M14 performs the processing of steps S210 to S220 for the group 1, thereby calculating a gradation value range (step S230). Since the gradation value range '47' of the group 1 is within the standard range Th2 (step S230: Yes), the reduction unit M14 calculates an average value '73' of the three gradation values in the group 1. On the other hand, since the group 2 has only one gradation value (step S215: Yes), the reduction unit M14 maintains the one gradation value without executing the processing of steps S220 to S290 for the group 2. As shown in FIG. 6(C), the reduction unit M14 replaces the three gradation values corresponding to the group 1 in the processing target group dgc with the average value of the three gradation values of the group 1 (step S250). According thereto, the colors that are expressed by the gradation values in the block are reduced from four colors to two colors.

Example 4

The averaging processing (FIG. 5) for the data group dg shown in FIG. 4(F) will be described with reference to FIG. 7(A). The classification unit M14a classifies the processing target group (which is indicated with a reference numeral 'dgd' in FIG. 7(A)) into two groups (group 1 and group 2) in the same manner as the processing of the above-described Example 2 (step S280). The reduction unit M14 sets the two classified groups as new data groups that can be selected in step S210 (step S290). The classification unit M14a further classifies the group 1, which is the processing target group, into two groups (group 1-1 and group 1-2) in the same manner as the processing of the above-described Example 2 (step S280).

The reduction unit M14 performs the processing of steps S210 to S220 for the groups 1-1 and 1-2, thereby calculating gradation value ranges, respectively (step S230). Since the gradation value range '15' of the group 1-1 is within the standard range Th2 (step S230: Yes), the reduction unit M14 calculates an average value '57' of the two gradation values in the group 1-1. On the other hand, since the group 2 and the group 1-2 have only one gradation value (step S215: Yes), the reduction unit M14 maintains the one gradation value without executing the processing of steps S220 to S290 for the group 2 and the group 1-2. As shown in FIG. 7(A), the reduction unit M14 replaces the two gradation values corresponding to the group 1-1 in the processing target group dgd with the average value of all the gradation values of the group 1-1 (step S250). According thereto, the colors that are expressed by the gradation values in the block are reduced from four colors to three colors.

Example 5

Figure 7B:
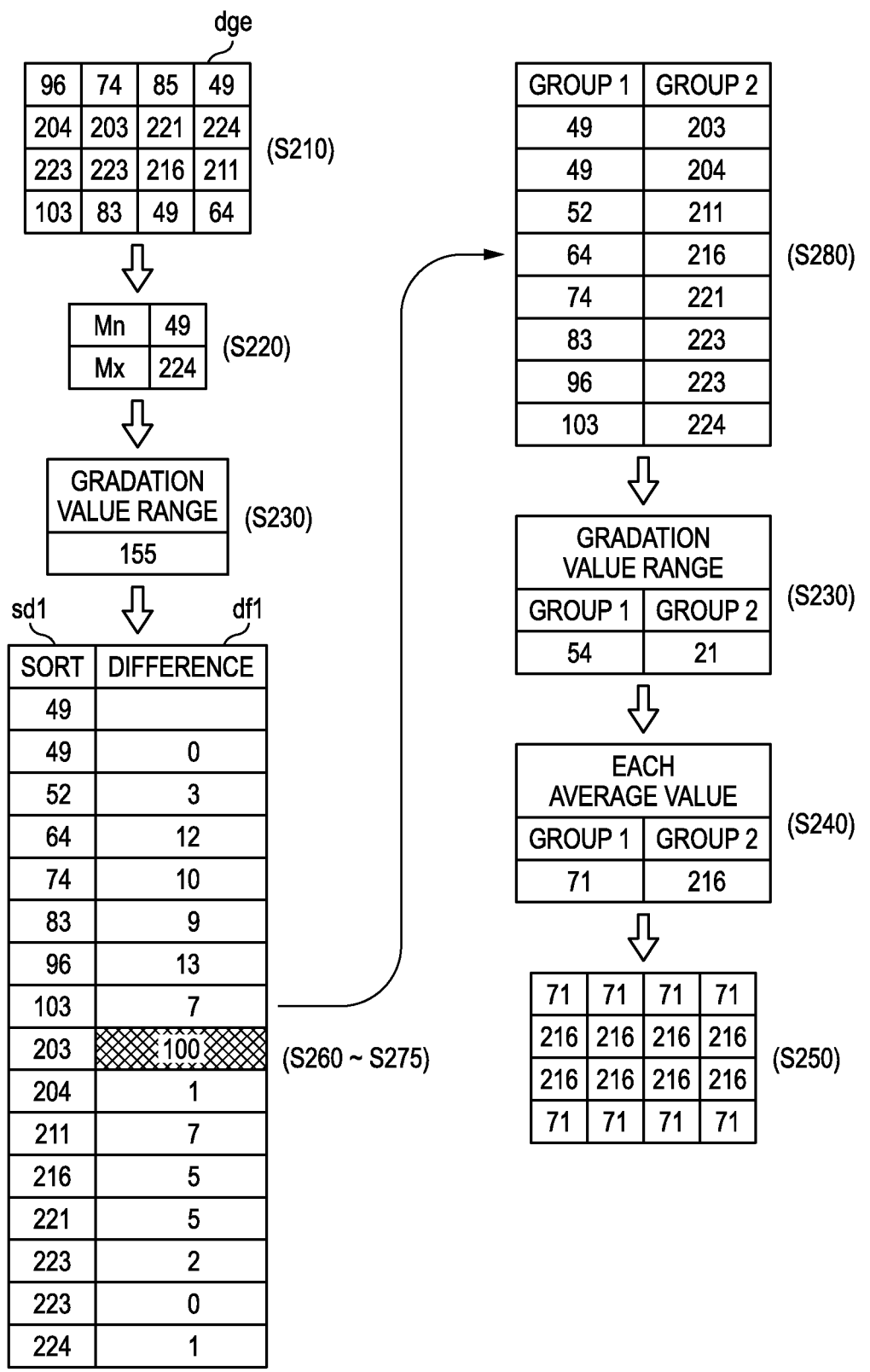

The averaging processing (FIG. 5) that is performed when the size of the processing target block is set with 4×4 pixels (when the color-number reduction processing is the third time processing) will be described with reference to FIG. 7(B). The reduction unit M14 sets the data group of the block of 4×4 pixels as the processing target group (which is indicated with a reference numeral 'dge' in FIG. 7(B)) in step S210. Incidentally, as shown in FIG. 7(B), since the gradation value '49' and the gradation value '203' are included two by two, respectively, the number of the types of the gradation values included in the processing target group dge is 14 types. The classification unit M14a classifies the processing target group dge into two groups (group 1 and group 2) in the same manner as the processing of the above-described Example 2 (step S280). The reduction unit M14 sets the two classified groups as new data groups that can be selected in step S210 (step S290). The reduction unit M14 performs the same processing as the processing of the Example 2 for the groups 1 and 2, thereby calculating an average value '71' of the eight gradation values in the group 1 and an average value '216' of the eight gradation values in the group 2 (S240). As shown in FIG. 7(B), the reduction unit M14 replaces the eight gradation values corresponding to the group 1 in the processing target group dge with the average value of the eight gradation values of the group 1 and replaces the eight gradation values corresponding to the group 2 with the average value of the eight gradation values of the group 2 (step S250). According thereto, the colors that are expressed by the gradation values in the block are reduced from fourteen colors to two colors.

Like this, when the number of pixels in the block that is used in the color-number reduction processing is K (K is an integer of 3 or larger), the color-number (the number of colors) in the block can be reduced to one of 2 to (K−1) in the color-number reduction processing.

In the above-described exemplary embodiment, the computing apparatus 100 (reduction unit M14) performs the color-number reduction processing (averaging processing: FIG. 5) and generates the image data having the reduced number of colors from the processing target image data, and the computing apparatus 100 uses the image data having the reduced number of colors to generate the compressed print data. According thereto, it is possible to reduce the data size of the input image (processing target image). Further, in the color-number reduction processing (averaging processing), the computing apparatus 100 calculates the average value of all the gradation values in the processing target group of the processing target block (FIG. 5: step S240) and replaces all the gradation values in the processing target group with the average value (step S250), thereby reducing the number of colors from the processing target image data. According thereto, it is possible to set the gradation-number (the number of bits) of the respective gradation values included in the processing target image data before the averaging processing to be the same as the gradation-number (the number of bits) of the respective gradation values included in the image data having the reduced number of colors. That is, it is possible to set the number of colors, which can be expressed in the processing target image before the averaging processing, to be the same as the number of colors that can be expressed in the image having the reduced number of colors expressed with the image data having the reduced number of colors. That is, the numbers of bits of the gradation values included in the image data (target image data) before the color-number reduction processing and in the image data (image data having the reduced number of colors) after the color-number reduction processing are the same. Hence, although the number of the types of the colors expressed with the image data after the color-number reduction processing is reduced as compared to the image data before the color-number reduction processing, each pixel of the image expressed by the image data after the color-number reduction processing can express any one gradation of 256 gradations, like each pixel expressed by the image data before the color-number reduction processing. As a result, it is possible to suppress the reproducibility of the processing target image (input image) from being lowered. As described above, the computing apparatus 100 of this exemplary embodiment can reduce the data size of the processing target image (input image) while suppressing the reproducibility of the processing target image (input image) from being lowered.

In the above-described exemplary embodiment, when the data size of the compressed dot data, which is generated using the image data having the reduced number of colors after the Rth (R is 1 or 2) color-number reduction processing, is larger than the threshold value Th1 (FIG. 2: S80: No), the computing apparatus 100 (reduction unit M14) sets the block, which is larger than the block set in the Rth color-number reduction processing, in the (R+1)th color-number reduction processing (FIG. 3: S120 or S125) and then executes the averaging processing (FIG. 5). According thereto, it is possible to further reduce the data size of the processing target image data, so that it is possible to generate the compressed dot data having the data size smaller than the threshold value Th1.

In the above-described exemplary embodiment, the size of the block that is set in the (R+1)th color-number reduction processing is larger than that of the block that is set in the Rth color-number reduction processing. That is, the number of pixels that are included in the block set in the (R+1)th color-number reduction processing is larger than the number of pixels that are included in the block set in the Rth color-number reduction processing. As a result, an area configured by the plurality of pixels in the block is enlarged in the processing target image. Therefore, it is possible to set the same color in the wide area of the processing target image. Thereby, it is possible to further reduce the number of colors of the processing target image.

In the above-described exemplary embodiment, when the gradation value range is within the threshold value Th2 (step S230: Yes) in the color-number reduction processing (averaging processing: FIG. 5), the computing apparatus 100 (reduction unit M14) calculates the average value of all the gradation values in the processing target group of the processing target block (FIG. 5: step S240) and replaces all the gradation values in the processing target group with the calculated average value (step S250). According thereto, it is possible to determine whether or not to set the gradation values (all the gradation values in the processing target group) of two or more pixels in the processing target block to the same value, based on the standard range Th2. Therefore, it is possible to adjust the number of colors to be reduced by changing the standard range.

In the above-described exemplary embodiment, when the gradation value range is beyond the threshold value Th2 (step S230: No) in the color-number reduction processing (averaging processing: FIG. 5), the computing apparatus 100 (reduction unit M14) prepares the difference data, which indicates the adjacency gradation value difference, by using the sorted data in which the gradation values are arranged in ascending order (step S270), and classifies the processing target group into two groups based on the adjacency gradation value difference (step S280). According thereto, it is possible to set the gradation values close to each other in the processing target block to the same value. As a result, it is possible to suppress the reproducibility of the processing target image from being lowered.

In the above-described exemplary embodiment, in the color-number reduction processing (averaging processing: FIG. 5), the computing apparatus 100 (reduction unit M14) is configured to specify the two gradation values having the largest adjacency gradation value differences, classify the first gradation value of the two specified gradation values and the gradation value smaller than the first gradation value into one group, and classify the second gradation value of the two specified gradation values, which is larger than the first gradation value, and the gradation value larger than the second gradation value into the other group (step S280). Hence, it is possible to set the two gradation values, which are most distant from each other in the processing target block, to the different gradation values. As a result, it is possible to suppress the reproducibility of the processing target image from being lowered.

The pixel having a gradation value indicating white or pixel having a gradation value indicating black is much used in a letter and the like, for example, and is apt to configure an edge part of an image. Hence, in the above-described exemplary embodiment, when there is a pixel having a gradation value indicating white or black in the processing target block (step S135: Yes) in the color-number reduction processing (averaging processing: FIG. 5), the computing apparatus 100 (reduction unit M14) excludes the pixels having the gradation values indicating white and black from the averaging processing target (step S140). That is, the gradation value indicating white or black is not changed in the averaging processing (it is maintained at the gradation value in the processing target image data). Therefore, it is possible to suppress the reproducibility of the edge part from being lowered, for example.

In the above-described exemplary embodiment, the number of pixels of the image having the reduced number of colors, which is expressed by the image data having the reduced number of colors generated in the color-number reduction processing (FIG. 3), is the same as the number of pixels of the processing target image before the image having the reduced number of colors. As a result, it is possible to suppress the reproducibility of the edge part of the processing target image from being lowered, for example.

In the above-described exemplary embodiment, the halftone processing (FIG. 2: S60) is performed using the dither matrix for the image data having the reduced number of colors after the color-number reduction processing. According thereto, the group of the same data pattern is apt to be continuously formed in the dot data generated by the halftone processing, so that it is possible to increase the compression ratio of the compression processing by the compression unit M18.

In this exemplary embodiment, the compressed dot data is an example of the compressed image data. In this exemplary embodiment, the gradation value that is included in the image data having the reduced number of colors is an example of the color value that is included in the image data having the reduced number of colors. In this exemplary embodiment, the adjacency gradation value is an example of the adjacency color value. In this exemplary embodiment, the size of the block that is set in the Rth (R is 1 or 2) color-number reduction processing is an example of the first processing condition, and the size of the block that is set in the (R+1)th color-number reduction processing is an example of the second processing condition.

(B) Second Exemplary Embodiment

In a second exemplary embodiment, the color-number reduction processing is executed based on following conditions.

Processing condition 1: The size of the block is fixed. For example, a block of 4×4 pixels is used.

Processing condition 2: When the color-number reduction processing is again executed, the value of the standard range Th2 is changed.

In the below, the color-number reduction processing of the second exemplary embodiment will be described.

Figure 8:
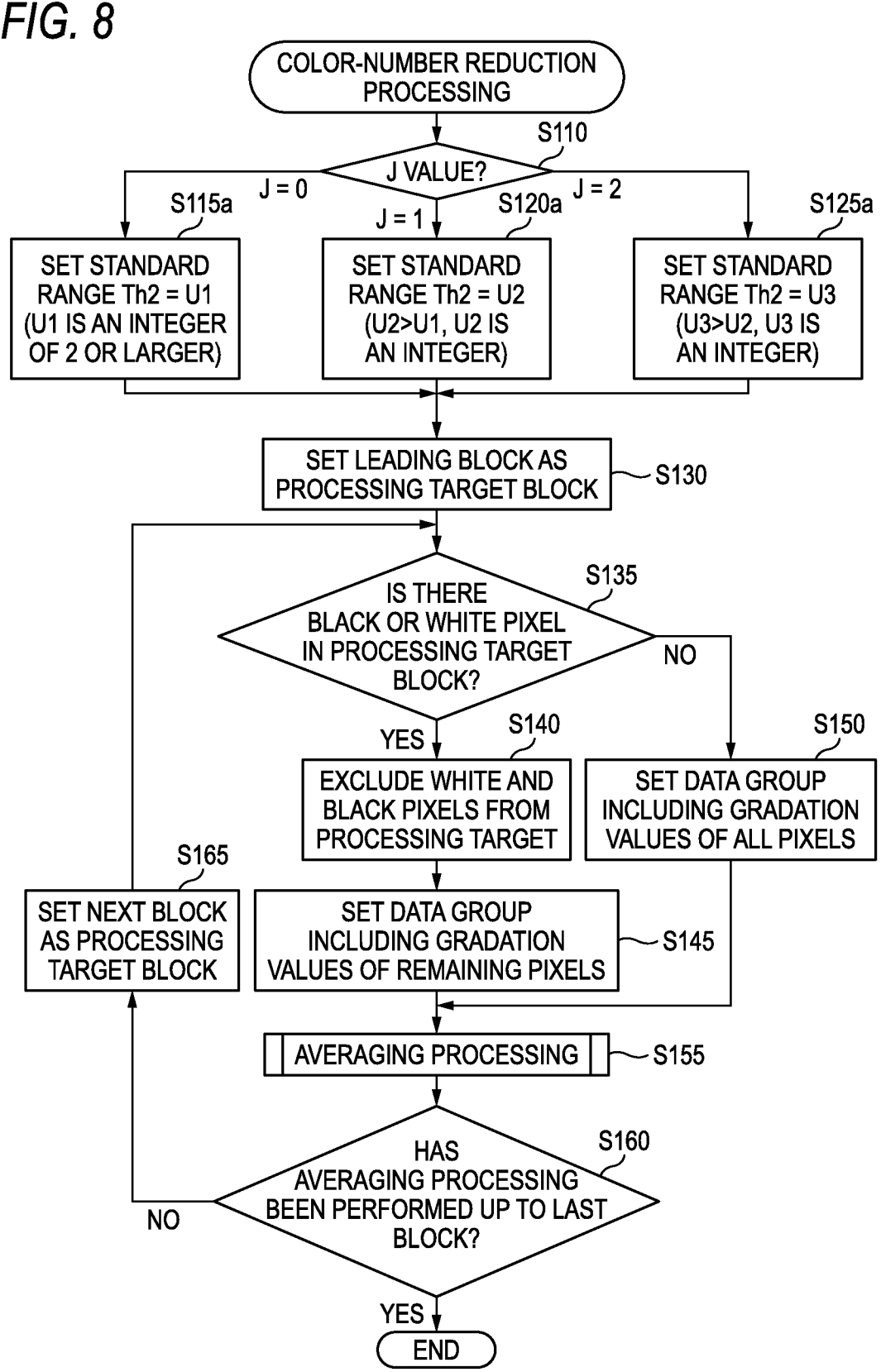
FIG. 8 is a flowchart showing color-number reduction processing according to a second exemplary embodiment.

FIG. 8 is a flowchart showing the color-number reduction processing of the second exemplary embodiment. In the color-number reduction processing of the second exemplary embodiment shown in FIG. 8, processing of steps S115a to S125a is executed instead of the processing of steps S115 to S125 in the color-number reduction processing of the first exemplary embodiment. In the color-number reduction processing of the second exemplary embodiment, the same processing as that of the color-number reduction processing of the first exemplary embodiment is indicated with the same reference numerals and the descriptions thereof are omitted.

In the color-number reduction processing of the second exemplary embodiment (FIG. 8), when the number of color-number reduction processing times J is 0 (which means that the color-number reduction processing is the first time processing) (step S110: J=0), the reduction unit M14 sets the standard range Th2 with U1 (U1 is an integer of 1 or larger) (step S115a). When the number of color-number reduction processing times J is 1 (which means that the color-number reduction processing is the second time processing) (step S110: J=1), the reduction unit M14 sets the standard range Th2 with U2 (U2 is an integer larger than U1) (step S120a). When the number of color-number reduction processing times J is 2 (which means that the color-number reduction processing is the third time processing) (step S110: J=2), the reduction unit M14 sets the standard range Th2 with U3 (U3 is an integer larger than U2) (step S125a). For example, U1 is set to be 16, U2 is set to be 32 and U3 is set to be 64.

In the above-described exemplary embodiment, when the data size of the compressed dot data, which is generated using the image data having the reduced number of colors after the Rth (R is 1 or 2) color-number reduction processing, is larger than the threshold value Th1 (FIG. 2: S80: No), in the (R+1)th color-number reduction processing, the computing apparatus 100 (reduction unit M14) sets the standard range Th2 that is wider than the standard range Th2 set in the Rth color-number reduction processing (FIG. 8: S120a or S125a) and then executes the averaging processing (FIG. 5). According thereto, it is possible to further reduce the data size of the processing target image data, so that it is possible to generate the compressed dot data having the data size smaller than the threshold value Th1.

In the second exemplary embodiment, the standard range Th2 that is set in the (R+1)th color-number reduction processing (FIG. 8) is wider than the standard range Th2 that is set in the Rth color-number reduction processing. As a result, it is possible to set the colors of many pixels in the processing target block to be the same in the (R+1)th color-number reduction processing, so that it is possible to further reduce the number of colors of the processing target image. Incidentally, in this second exemplary embodiment, the area of the standard range that is set in the Rth color-number reduction processing is an example of the first processing condition, and the area of the standard range that is set in the (R+1)th color-number reduction processing is an example of the second processing condition.

(C) Modified Exemplary Embodiments (C-1) In the above-described exemplary embodiments, in the (R+1)th (R is 1 or 2) color-number reduction processing, the reduction unit M14 uses, as the processing target image data, the processing target image data that is set in step S15 of the print data generation processing (FIG. 2). However, the invention is not limited thereto. For example, in the (R+1)th color-number reduction processing, the reduction unit M14 may use, as the processing target image data, the image data having the reduced number of colors that is set in step S170 of the Rth color-number reduction processing.

(C-2) In the above-described exemplary embodiments, the reduction unit M14 executes the color-number reduction processing by using the K image data (monochrome image data) consisting of the monochromatic pixel data. However, the invention is not limited thereto. For example, the reduction unit M14 may execute the color-number reduction processing by using color image data, not the monochrome image data. As the color image data, RGB image data or CMYK image data that expresses a color of a pixel with gradation values (for example, 256 gradations of 0 to 255) of four color components of cyan, magenta, yellow and black may be used.

(C-3) In the above-described exemplary embodiments, the reduction unit M14 determines whether or not to replace all the gradation values in the processing target group with the same value (average value of the gradation values in the processing group) in the averaging processing (FIG. 5) (which is also referred to as replacement determination), based on the gradation value range. However, the invention is not limited thereto. For example, the reduction unit M14 may perform the replacement determination based on a value indicating a distance in a Lab space, instead of the gradation value range. Generally, the reduction unit M14 preferably performs the replacement determination based on the difference value indicating a difference of colors of the pixels in the processing target group.

(C-4) In the above-described exemplary embodiments, the compression unit M18 compresses the dot data, which is generated by performing the halftone processing for the image data having the reduced number of colors. However, the invention is not limited thereto. For example, the compression unit M18 may compress the image data having the reduced number of colors, as it is, and then generate the compressed image data having the reduced number of colors. This processing may be executed when transmitting and receiving the compressed image data having the reduced number of colors through a data communication or when storing the compressed image data having the reduced number of colors in a storage device for a long time, for example.

(C-5) In the above-described exemplary embodiments, the compression unit M18 executes the pattern compression, as the compression processing of the dot data. However, the invention is not limited thereto. For example, the compression method that is used by the compression unit M18 may be a method capable of compressing the dot data when the same data pattern is continuously arranged in at least one of the lateral (line) direction and longitudinal direction in the dot data arranged in a matrix shape, for example. As the compression method, a Huffman encoding, a Run-Length Encoding, a Deflate compression and the like may be used.

(C-6) In the above-described exemplary embodiments, the reduction unit M14 classifies the processing target group into two groups before and after the gradation values having the largest adjacency gradation value differences in the sorted data in the color-number reduction processing (averaging processing). However, the invention is not limited thereto. For example, the reduction unit M14 may classify the processing target group before and after gradation values having adjacency gradation value differences in the sorted data larger than a prescribed value.

(C-7) In the above-described exemplary embodiments, when the data size of the compressed dot data is unable to be reduced to the threshold value Th1 or smaller (FIG. 2: step S80: No), the reduction unit M14 may execute the color-number reduction processing up to three times. However, the invention is not limited thereto. For example, when the data size of the compressed dot data is unable to be reduced to the threshold value Th1 or smaller, the reduction unit M14 may execute S times (S is an integer of 2 or 4 or larger) the color-number reduction processing. In this case, in the Sth color-number reduction processing, processing of setting a size of a block to be larger than a size of a block set in (S−1)th color-number reduction processing and/or processing of setting a size of a block to be wider than an area of a standard range set in (S−1)th color-number reduction processing is executed.

(C-8) In the first exemplary embodiment, when performing the color-number reduction processing more than once, the reduction unit M14 sets the size of the block to be larger than the size of the block set in the previous color-number reduction processing whenever executing the color-number reduction processing. Here, the size of the block (the number N of pixels configuring the block) is arbitrary and may be appropriately changed. In general, the reduction unit M14 preferably uses a first type of a block constituted by N1 (N1 is an integer of 2 or larger) pixels in Tth color-number reduction processing, and uses a second type of a block constituted by N2 (N2 is an integer larger than N1) pixels in (T+1)th color-number reduction processing.

Further, in the second exemplary embodiment, when performing the color-number reduction processing more than once, the reduction unit M14 sets the area of the standard range to be wider than the area of the standard range set in the previous color-number reduction processing whenever executing the color-number reduction processing. Here, the area of the standard range is arbitrary and may be appropriately changed.

Further, the change of the block size (first exemplary embodiment) and the change of the area of the standard range (second exemplary embodiment) may be combined. For example, for a case where the color-number reduction processing is performed more than once, when the reduction unit M14 changes any one of the block size and the area of the standard range in the Tth color-number reduction processing (T is an integer of 2 or larger), the reduction unit M14 may change the other of the block size and the area of the standard range in the (T+1)th color-number reduction processing. Further, when a third processing condition, other than the block size and the area of the standard range, is adopted in the color-number reduction processing, the reduction unit M14 may change the third processing condition. Regarding the third processing condition, the number of pixels for which the gradation value is changed may be limited in the first color-number reduction processing. In this case, the limit value of the number of pixels may be increased whenever the color-number reduction processing is repeated.

Generally, it is preferable that the reduction unit M14 changes the processing condition of the (T+1)th color-number reduction processing into a condition which can easily reduce the number of colors expressed by the plurality of pixels in the block of the processing target image compared to the processing condition of the Tth color-number reduction processing. In other words, the processing condition of the (T+1)th color-number reduction processing is preferably a condition that the compression ratio is increased when compressing the image data having the reduced number of colors after the processing with the corresponding processing condition, compared to the processing condition of the Tth color-number reduction processing.

(C-9) In the above-described exemplary embodiments, the reduction unit M14 reduces the number of colors by using the standard range in the color-number reduction processing. However, the invention is not limited thereto. For example, the reduction unit M14 may reduce the number of colors without using the standard range. For instance, the reduction unit M14 may reduce the number of colors by replacing the largest gradation value and the second largest gradation value of the gradation values included in the processing target block with the same value.

(C-10) In the first exemplary embodiment, the reduction unit M14 can execute the color-number reduction processing up to three times. However, the invention is not limited thereto. For example, the reduction unit M14 may execute the color-number reduction processing only one time. For instance, the reduction unit M14 may execute the color-number reduction processing only one time with an allowable maximum processing condition (for example, block of 4×4 pixels and standard range Th2 '64').

(C-11) In the above-described exemplary embodiments, a part of the configurations implemented by hardware may be replaced with software. Alternatively, a part of the configurations implemented by software may be replaced with hardware.

Although the invention has been described with reference to the exemplary embodiments and modified exemplary embodiments, the embodiments are provided just to understand the invention, not to limit the invention. The invention can be changed and improved without departing from the scope of the claims, and the invention includes the equivalents thereto.

[FIG. 1]
M10: printer driver
M12: pre-processing unit
M14: reduction unit
M14a: classification unit
M14aa: specifying unit
M18: compression unit
M18a: halftone processing unit
M19: file size determination unit
120: internal storage device
130: external storage device
132: driver program
134: dither matrix
136: color profile
137: image data
170: operation unit
180: display unit
190: communication unit
212: control circuit
M20: apparatus control unit
250: printer engine
290: communication unit
214: volatile memory
216: non-volatile memory
270: operation unit
280: display unit

[FIG. 2]
Print Data Generation Processing
S3: Acquire input image data
S5: Rasterizing processing
S10: Color conversion processing
S15: Setting of processing target image data
S20: Color-number reduction flag OFF
  The number of color-number reduction processing times J=0
S30: Color-number reduction flag ON?
S40: Color-number reduction processing
S60: Halftone processing
S70: Compression processing
S80: Is size of compressed dot data a threshold value Th1 or smaller?
S85: Generate print data
S100: Color-number reduction flag ON

[FIG. 3]
Color-Number Reduction Processing
S110: J value?
S115: Set block of 2×2 pixels
S120: Set block of 3×3 pixels
S125: Set block of 4×4 pixels
S130: Set leading block as processing target block
S135: Is there black or white pixel in processing target block?
S140: Exclude white and black pixels from processing target
S145: Set data group including gradation values of remaining pixels
S150: Set data group including gradation values of all pixels
S155: Averaging processing
S160: Has averaging processing been performed up to last block?
S165: Set next block as processing target block

[FIG. 4]
before processing, after processing, block
small←gradation value→large
white black

[FIG. 5]
Averaging Processing
S210: Select one processing target group from set data group
S215: Is the number of gradation values included in processing target group one?
S220: Specify maximum value Mx and minimum value Mn of gradation values in processing target group
S230: Is gradation value range within standard range Th2?
S240: Calculate average value of all gradation values in processing target group
S250: Replace all gradation values in processing target group with average value
S260: Sort gradation values in ascending order to thus prepare sorted data
S270: Calculate adjacency gradation value difference in sorted data
S275: Specify two gradation values having largest adjacency gradation value differences
S280: Classify processing target group into two groups before and after gradation values having largest adjacency gradation value differences
S290: Set classified groups as new data groups
S295: Are all data groups set as processing target?

[FIG. 6]
(a) gradation value range
  average value
(b) gradation value range
  average value
  sort, difference
  group 1, group 2
  gradation value range, group 1, group 2
  each average value, group 1, group 2
(c) gradation value range
  average value
  sort, difference
  group 1, group 2
  gradation value range, group 1, group 2
  each average value, group 1, group 2

[FIG. 7]
(a) gradation value range
  sort, difference
  group 1, group 2
  gradation value range, group 1, group 2
  sort, difference
  group 1-1, group 1-2
  gradation value range, group 1-1, group 1-2
  each average value, group 1-1, group 1-2, group 2
(b) gradation value range
  sort, difference
  group 1, group 2
  gradation value range, group 1, group 2
  each average value, group 1, group 2

[FIG. 8]
Color-Number Reduction Processing
S110: J value?
S115a: Set standard range Th2=U1 (U1 is an integer of 2 or larger)
S120a: Set standard range Th2=U2 (U2>U1, U2 is an integer)
S125a: Set standard range Th2=U3 (U3>U2, U3 is an integer)
S130: Set leading block as processing target block
S135: Is there black or white pixel in processing target block?
S140: Exclude white and black pixels from processing target
S145: Set data group including gradation values of remaining pixels
S150: Set data group including gradation values of all pixels
S155: Averaging processing S160: Has averaging processing been performed up to last block?
S165: Set next block as processing target block

What is claimed is:

1. An image processing apparatus comprising:
a processor configured to operate as:
a reduction unit configured to execute color-number reduction processing for each block configured by a plurality of pixels included in a processing target image expressed by processing target image data, the color-number reduction processing comprising reducing the number of colors expressed by the plurality of pixels in the block to generate image data having the reduced number of colors from the processing target image data, a gradation-number of each color value included in the image data having the reduced number of colors being the same as a gradation-number of each color value included in the processing target image data; and
a compression unit configured to execute compression processing using the image data having the reduced number of colors to generate compressed image data,
wherein the reduction unit is configured to execute first color-number reduction processing by using a first type of the block constituted by N1 pixels, N1 being an integer of 2 or larger,
wherein when a data size of the compressed image data after the first color-number reduction processing is larger than a threshold value, the reduction unit is configured to execute second color-number reduction processing by using a second type of the block constituted by N2 pixels, N2 being an integer larger than N1, and
wherein the processing target image data used in the second color-number reduction processing is the processing target image data before the first color-number reduction processing.

2. The image processing apparatus according to claim 1,
wherein the reduction unit is configured to execute:
processing of maintaining color values of two pixels of the plurality of pixels included in the block when a difference value indicating a difference of colors between the two pixels is beyond a standard range; and
processing of setting color values of the two pixels to be the same when the difference value between the two pixels is within the standard range.

3. The image processing apparatus according to claim 1,
wherein a difference value between two pixels of the plurality of pixels included in the block is a difference of color values of the two pixels,
wherein the reduction unit comprises a classification unit configured to, when a difference between a maximum value and a minimum value of the color values of the plurality of pixels included in the block is beyond a standard range, classify the plurality of pixels included in the block into two or more groups comprising a first group and a second group based on an adjacency color value difference, the adjacency color value difference being a difference of color values neighboring to each other when the color values of the respective pixels being arranged in order of size, and
wherein the reduction unit is configured to set a color value of a pixel included in the first group to a first value, and to set a color value of a pixel included in the second group to a second value that is different from the first value.

4. The image processing apparatus according to claim 3,
wherein the classification unit comprises a specifying unit configured to specify two color values having the largest adjacency color value difference from the color values of the plurality of pixels included in the block,
wherein the classification unit is configured to classify a first color value of the two color values and a color value that is smaller than the first color value into the first group, and to classify a second color value of the two color values, which is larger than the first color value, and a color value that is larger than the second color value into the second group, and
wherein the second value is larger than the first value.

5. The image processing apparatus according to claim 1,
wherein the reduction unit is configured to maintain a color value of a pixel belonging to a specific range having one of a maximum value and a minimum value of color values that the respective pixels of the processing target image can take.

6. The image processing apparatus according to claim 1,
wherein the number of pixels configuring the processing target image is the same as the number of pixels configuring an image having the reduced number of colors expressed by the image data having the reduced number of colors.

7. A non-transitory computer-readable storage medium having an image processing program stored thereon and readable by a computer, the image processing program, when executed by the computer, causes the computer to implement functions comprising:
a reduction function of executing color-number reduction processing for each block configured by a plurality of pixels included in a processing target image expressed by processing target image data, the color-number reduction processing comprising reducing the number of colors expressed by the plurality of pixels in the block to generate image data having the reduced number of colors from the processing target image data, a gradation-number of each color value included in the image data having the reduced number of colors being the same as a gradation-number of each color value included in the processing target image data; and
a compression function of executing compression processing using the image data having the reduced number of colors to thus generate compressed image data,
wherein the reduction function executes first color-number reduction processing by using a first type of the block constituted by N1 pixels, N1 being an integer of 2 or larger,
wherein when a data size of the compressed image data after the first color-number reduction processing is larger than a threshold value, the reduction function executes second color-number reduction processing by using a second type of the block constituted by N2 pixels, N2 being an integer larger than N1, and
wherein the processing target image data used in the second color-number reduction processing is the processing target image data before the first color-number reduction processing.

8. The non-transitory computer-readable storage medium according to claim 7,
wherein the reduction function executes:
processing of maintaining color values of two pixels of the plurality of pixels included in the block when a difference value indicating a difference of colors between the two pixels is beyond a standard range; and processing of setting color values of the two pixels to be the same when the difference value between the two pixels is within the standard range.

9. The non-transitory computer-readable storage medium according to claim 7,
wherein a difference value between two pixels of the plurality of pixels included in the block is a difference of color values of the two pixels,
wherein the reduction function comprises a classification function of, when a difference between a maximum value and a minimum value of the color values of the plurality of pixels included in the block is beyond a standard range, classifying the plurality of pixels included in the block into two or more groups comprising a first group and a second group based on an adjacency color value difference, the adjacency color value difference being a difference of color values neighboring to each other when the color values of the respective pixels being arranged in order of size, and
wherein the reduction function sets a color value of a pixel included in the first group to a first value, and sets a color value of a pixel included in the second group to a second value that is different from the first value.

10. The non-transitory computer-readable storage medium according to claim 9,
wherein the classification function comprises a specifying function of specifying two color values having the largest adjacency color value difference from the color values of the plurality of pixels included in the block,
wherein the classification function classifies a first color value of the two color values and a color value that is smaller than the first color value into the first group, and classifies a second color value of the two color values, which is larger than the first color value, and a color value that is larger than the second color value into the second group, and
wherein the second value is larger than the first value.

11. The non-transitory computer-readable storage medium according to claim 7,
wherein the reduction function maintains a color value of a pixel belonging to a specific range having one of a maximum value and a minimum value of color values that the respective pixels of the processing target image can take.

12. The non-transitory computer-readable storage medium according to claim 7,
wherein the number of pixels configuring the processing target image is the same as the number of pixels configuring an image having the reduced number of colors expressed by the image data having the reduced number of colors.

13. An image processing apparatus comprising:
a processor configured to operate as:
a reduction unit configured to execute color-number reduction processing for each block configured by a plurality of pixels included in a processing target image expressed by processing target image data, the color-number reduction processing comprising reducing the number of colors expressed by the plurality of pixels in the block to generate image data having the reduced number of colors from the processing target image data, a gradation-number of each color value included in the image data having the reduced number of colors being the same as a gradation-number of each color value included in the processing target image data; and
a compression unit configured to execute compression processing using the image data having the reduced number of colors to generate compressed image data,
wherein when a difference value indicating a difference of colors between two pixels of the plurality of pixels included in the block before color-number reduction processing is within a standard range, the color-number reduction processing comprises processing of setting color values of the two pixels to be the same,
wherein when the difference value between the two pixels before color-number reduction processing is within a first standard range, the reduction unit is configured to execute first color-number reduction processing by executing the processing of setting color values of the two pixels to be the same,
wherein when a data size of the compressed image data after the first color-number reduction processing is larger than a threshold value, and when the difference value between the two pixels before color-number reduction processing is within a second standard range, which is wider than the first standard range, the reduction unit is configured to execute second color-number reduction processing by executing the processing of setting color values of the two pixels to be the same, and
wherein the processing target image data used in the second color-number reduction processing is the processing target image data before the first color-number reduction processing.

14. The image processing apparatus according to claim 13,
wherein the reduction unit is configured to execute:
processing of maintaining color values of two pixels of the plurality of pixels included in the block when a difference value indicating a difference of colors between the two pixels is beyond a standard range; and
processing of setting color values of the two pixels to be the same when the difference value between the two pixels is within the standard range.

15. The image processing apparatus according to claim 13,
wherein a difference value between two pixels of the plurality of pixels included in the block is a difference of color values of the two pixels,
wherein the reduction unit comprises a classification unit configured to, when a difference between a maximum value and a minimum value of the color values of the plurality of pixels included in the block is beyond a standard range, classify the plurality of pixels included in the block into two or more groups comprising a first group and a second group based on an adjacency color value difference, the adjacency color value difference being a difference of color values neighboring to each other when the color values of the respective pixels being arranged in order of size, and
wherein the reduction unit is configured to set a color value of a pixel included in the first group to a first value, and to set a color value of a pixel included in the second group to a second value that is different from the first value.

16. The image processing apparatus according to claim 15,
wherein the classification unit comprises a specifying unit configured to specify two color values having the largest adjacency color value difference from the color values of the plurality of pixels included in the block,
wherein the classification unit is configured to classify a first color value of the two color values and a color value that is smaller than the first color value into the first group, and to classify a second color value of the two color values, which is larger than the first color value, and a color value that is larger than the second color value into the second group, and wherein the second value is larger than the first value.

17. The image processing apparatus according to claim 13, wherein the reduction unit is configured to maintain a color value of a pixel belonging to a specific range having one of a maximum value and a minimum value of color values that the respective pixels of the processing target image can take.

18. The image processing apparatus according to claim 13, wherein the number of pixels configuring the processing target image is the same as the number of pixels configuring an image having the reduced number of colors expressed by the image data having the reduced number of colors.

19. A non-transitory computer-readable storage medium having an image processing program stored thereon and readable by a computer, the image processing program, when executed by the computer, causes the computer to implement functions comprising:

a reduction function of executing color-number reduction processing for each block configured by a plurality of pixels included in a processing target image expressed by processing target image data, the color-number reduction processing comprising reducing the number of colors expressed by the plurality of pixels in the block to generate image data having the reduced number of colors from the processing target image data, a gradation-number of each color value included in the image data having the reduced number of colors being the same as a gradation-number of each color value included in the processing target image data; and a compression function of executing compression processing using the image data having the reduced number of colors to thus generate compressed image data, wherein when a difference value indicating a difference of colors between two pixels of the plurality of pixels included in the block before color-number reduction processing is within a standard range, the color-number reduction processing comprises processing of setting color values of the two pixels to be the same, wherein when the difference value between the two pixels before color-number reduction processing is within a first standard range, the reduction function executes first color-number reduction processing by executing the processing of setting color values of the two pixels to be the same, wherein when a data size of the compressed image data after the first color-number reduction processing is larger than a threshold value, and when the difference value between the two pixels before color-number reduction processing is within a second standard range, which is wider than the first standard range, the reduction function executes second color-number reduction processing by executing the processing of setting color values of the two pixels to be the same, and wherein the processing target image data used in the second color-number reduction processing is the processing target image data before the first color-number reduction processing.

\* \* \* \* \*